UNITED STATES PATENT OFFICE.

MAX BÜRCHARDT, OF MOUNT VERNON, NEW YORK.

IMPROVEMENT IN ANTISEPTIC COMPOUNDS.

Specification forming part of Letters Patent No. 220,121, dated September 30, 1879; application filed July 10, 1879.

*To all whom it may concern:*

Be it known that I, MAX BÜRCHARDT, of Mount Vernon, in the county of Westchester and State of New York, have invented a new and Improved Antiseptic Compound, which invention is fully set forth in the following specification.

This invention is an antiseptic compound consisting of peat, sulphate of iron, coke, and coal-tar, mixed together in about the proportions hereinafter specified.

In carrying out my invention, I use about fifty parts of peat, twenty parts of sulphate of iron, five parts of coke, and fifteen parts of coal-tar. These proportions obviously may be varied; but I find that good results are thereby obtained.

I combine the ingredients in the following manner: I pulverize the coke and the sulphate of iron together in a suitable grinding or stamping mill, and, having also pulverized the peat, I add the coal-tar and thoroughly mix the whole together. I adopt this method of combination because if the sulphate of iron is pulverized separately it adheres to the grinding or pounding surfaces, while in the presence of coke it can be readily pulverized.

Sulphate of iron is a known antiseptic, but is usually employed in solution. I employ it in a dry state mixed with substances—viz., peat and coke—adapted to absorb moisture, one of the chief causes of putrefaction. Peat in itself has no antiseptic properties, but serves to absorb miasma floating in the air, and to absorb water from objects subject to putrefaction. The same may be said of coke.

I use coal-tar chiefly as a deodorizer, but also as an agent to carbonize the fiber in the peat.

When all the ingredients are combined, a perfectly dry powder is obtained; and I have found that such a dry antiseptic is much superior in its action to the wet or moist antiseptics generally employed.

The manner of using my antiseptic is to strew or spread the same at the required spot or upon the required object in quantities varying with the condition of the place or object to be purified or kept in its condition.

In experimenting with my compound I have found that two and one-half pounds added to ten pounds of blood will keep the same odorless for a period of four months, at the end of which time the blood becomes dry and reduced to powder.

A great advantage of my compound is that it can be prepared at very little expense, since the ingredients are cheap and readily obtainable. Another advantage is the absence of substances, such as chlorides or carbolic acid, destructive to animal tissue.

What I claim is—

The antiseptic compound herein described, consisting of peat, sulphate of iron, coke, and coal-tar, mixed together in about the proportions specified.

In testimony that I claim the foregoing I have hereunto set my hand and seal this 7th day of July, 1879.

MAX BÜRCHARDT. [L. S.]

Witnesses:
W. HAUFF,
E. F. KASTENHUBER.